US012117098B2

(12) United States Patent
Yang et al.

(10) Patent No.: US 12,117,098 B2
(45) Date of Patent: Oct. 15, 2024

(54) FLOW CONTROL SMART VALVE AND FLOW CONTROL SYSTEM USING SAME

(71) Applicant: Sam Yang Comprehensive Valve Co., Ltd., Gyeonggi-do (KR)

(72) Inventors: Kyung Sam Yang, Gyeonggi-do (KR); Chan Hee Byun, Seoul (KR)

(73) Assignee: SAM YANG COMPREHENSIVE VALVE CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/735,427

(22) Filed: May 3, 2022

(65) Prior Publication Data

US 2022/0357754 A1 Nov. 10, 2022

(30) Foreign Application Priority Data

May 4, 2021 (KR) .......................... 10-2021-0057815

(51) Int. Cl.
| | | |
|---|---|---|
| *F16K 37/00* | (2006.01) | |
| *F16K 31/04* | (2006.01) | |
| *F16K 31/05* | (2006.01) | |
| *G05D 3/12* | (2006.01) | |

(52) U.S. Cl.
CPC .......... *F16K 37/0016* (2013.01); *F16K 31/04* (2013.01); *F16K 31/047* (2013.01); *F16K 31/05* (2013.01); *F16K 37/0083* (2013.01); *G05D 3/12* (2013.01)

(58) Field of Classification Search
CPC ............... F16K 37/005; F16K 37/0091; F16K 37/0041; F16K 31/047; F16K 31/046; F16K 31/04; F16K 31/05; F16K 37/008; F16K 37/37; F16K 37/0016; F16K 31/508

See application file for complete search history.

(56) References Cited

U.S. PATENT DOCUMENTS

| | | | | |
|---|---|---|---|---|
| 2,815,922 | A  * | 12/1957 | Louis ...................... | F16K 31/05 |
| | | | | 74/625 |
| 2015/0075652 | A1* | 3/2015 | Bell ..................... | F16K 37/0016 |
| | | | | 137/556 |
| 2016/0195195 | A1* | 7/2016 | Lv .......................... | F16K 31/508 |
| | | | | 251/129.11 |
| 2016/0281460 | A1* | 9/2016 | Wang .................. | E21B 41/0007 |
| 2016/0356026 | A1 | 12/2016 | Engler | |
| 2019/0331254 | A1* | 10/2019 | Taylor ................. | F16K 37/0016 |
| 2020/0264067 | A1* | 8/2020 | Lance .................. | G05D 7/0629 |

FOREIGN PATENT DOCUMENTS

| | | |
|---|---|---|
| DE | 102015118198 A1 | 4/2017 |
| EP | 3767143 A1 | 1/2021 |
| EP | 3792727 A1 | 3/2021 |

(Continued)

OTHER PUBLICATIONS

Extended European Search Report dated Oct. 7, 2022.
Japanese Office Action dated Jun. 27, 2023.

*Primary Examiner* — Atif H Chaudry
(74) *Attorney, Agent, or Firm* — Dickinson Wright PLLC (57) ABSTRACT

A flow control smart valve and a flow control system using the same, including an opening/closing unit disposed inside a flow path and selectively passing a fluid, and a drive unit coupled with the opening/closing unit to control a position of the opening/closing unit in the flow path.

5 Claims, 10 Drawing Sheets

(56) References Cited

FOREIGN PATENT DOCUMENTS

| | | | |
|---|---|---|---|
| JP | H03126109 | A | 5/1991 |
| JP | H04232514 | A | 8/1992 |
| JP | 2017072216 | A | 4/2017 |
| JP | 2020134993 | A | 8/2020 |
| KR | 100685220 | | 2/2007 |
| KR | 100924265 | B1 | 10/2009 |
| KR | 100979918 | B1 | 9/2010 |
| KR | 1020160019130 | | 2/2016 |
| KR | 101826924 | | 2/2018 |
| KR | 1020190068771 | | 6/2019 |
| KR | 20200056755 | A | 5/2020 |
| KR | 102139166 | B1 | 7/2020 |
| KR | 20200079770 | A * | 7/2020 |
| KR | 102237868 | B1 | 4/2021 |
| KR | 102242231 | B1 | 4/2021 |

* cited by examiner

FLOW CONTROL SMART VALVE AND FLOW CONTROL SYSTEM USING SAME

RELATED APPLICATIONS

The present disclosure claims priority to and the benefit of Korean Application 10-2021-0057815 filed on May 4, 2021, the entire contents of which are incorporated herein by reference.

TECHNICAL FIELD

The present disclosure relates to a valve for regulating a flow rate and a differential pressure in a flow path, and a system for efficiently controlling the flow rate supplied to a building using the same.

BACKGROUND

Patent document, KR 10-2019-0068771 A proposes a technology related to a flow control valve including: a valve housing provided with a block port connected to a cooling water outlet of a cylinder block, a head port connected to the cooling water outlet of a cylinder head, a radiator port connected to a radiator, a heat exchanger port connected to an oil cooler, and a heater core port connected to a heater core and a EGR cooler; a drive unit that provides rotational force; and a valve body that rotates at a predetermined angle within the valve housing by receiving rotational force from the drive unit, is formed to selectively communicate with the block port and the radiator port as the rotation angle changes, and is formed to selectively communicate with the heat exchanger port and the heater core port.

Patent document, KR 10-0685220 B1 proposes a technology related to an automatic constant flow control valve including: a valve body that forms an inlet through which a fluid is supplied, communicates with the inlet to form a variable flow path through which the supply fluid flows, and communicates with the variable flow path to form an outlet through which a constant flow rate of fluid is discharged; a housing installed between the inlet and outlet of the valve body and operated to control the flow rate of the variable flow path; a piston shaft-coupled to the inner center of the housing and slides up and down; an elastic member coupled to the piston to elastically support the piston; a cover coupled from the upper side of the housing to prevent separation of the piston and the elastic member; and a fluid inflow path for balancing that communicates with one side of the valve body and one side of the housing so that pressure fluid can be supplied to the space between the cover and the upper surface of the piston.

Patent document, KR 10-1826924 B1 proposes a technology related to a flow control valve including: a first part in which both ends of a spherical ball are cut to have a first side section and the first other side section, in which the diameter of the first side section is formed to be larger than the diameter of the first other side section, and in which a through hole is formed along the rotation shaft passing through the first side section and the first other side section; and a second part in which both ends of the ball are cut to have the second side section and the second other side section, in which the diameter of the second side section is formed to be smaller than the diameter of the second other side section, and in which an opening hole is formed along the rotation shaft passing through the second side section and the second other side section together with the first part, wherein the first part and the second part are coupled so that the through hole and the opening hole communicate with each other by joining the first other side section of the first part and the second side section of the second part.

Patent document, KR 10-2016-0019130 A proposes a technology related to a high-pressure flow control valve including: a first housing in which a flange for pipe coupling is formed on the outer circumference with an inlet/outlet port formed at the center thereof, in which a flow control coupling part that communicates with the straight flow path of the inlet/outlet and is enlarged more than the diameter of the inlet/outlet port is formed on one side, and in which a housing fastening flange is formed along the outer circumference of the flow control coupling part; a second housing; a flow control housing in which a plurality of coupling through holes are formed so that the first housing and the second housing correspond to the left and right sides respectively and are flange-coupled through the housing fastening flange, in which a fluid flow through hole is formed in the center thereof, in which O-ring grooves to which O-rings are coupled to maintain airtightness are formed on the left and right sides between the coupling through holes and the fluid flow through hole, in which a flow control means is combined to control the opening and closing of the inlet/outlet ports of the first and second housings so as not to interfere with the flow of the fluid around the fluid flow through hole, in which a flow through hole communicates perpendicularly to the downward direction of the fluid flow through hole, and a pipe fastening flange is formed along the outer circumference of the flow through hole; and a packing seat coupled to each of the inlet/outlet ports of the first housing and the second housing, and having an inclined surface to which the flow control means closely corresponds to control the flow of fluid into and out of the inlet/outlet ports by the flow control means.

SUMMARY

The present disclosure is intended to provide a valve for regulating a flow rate and a differential pressure of a flow path and a system for efficiently controlling the flow rate supplied to a building using the same.

In order to achieve the above objective, according to an embodiment of the present disclosure, there is provided a flow control smart valve, including: an opening/closing unit 100 disposed inside the flow path and selectively passing a fluid; and a drive unit 200 coupled with the opening/closing unit 100 to control a position of the opening/closing unit 100 in the flow path.

The opening/closing unit 100 of the present disclosure may include: an elevating part 110 disposed inside the flow path and selectively passing the fluid; and a housing 120 that accommodates the elevating part 110 therein, and in which a first side is coupled to an inlet pipe 1 and a second side is coupled to an outlet pipe 2.

The drive unit 200 of the present disclosure may include: a power part 210 that receives power and controls the position of the elevating part 110 in the flow path; a controller 220 that controls the power applied to the power part 210; and a power supply part 230 that interworks with the power part 210 and the controller 220 to supply power required to control the position of the elevating part 110.

The controller 220 of the present disclosure may include: a reception part 221 for receiving a measurement value for controlling the position of the elevating part 110; a calculation part 222 for determining whether to open or close the flow path by the elevating part 110 on the basis of the measurement value transmitted from the reception part 221;

and a transmission part 223 for transmitting the value calculated by the calculation part 222 to the outside.

The calculation part 222 of the present disclosure may include: an opening/closing calculation part 222-1 for determining whether to open or close the flow path; and an offset calculation part 222-2 for correcting an error with respect to the measurement value transmitted from the reception part 221.

The drive unit 200 of the present disclosure may include a display part 240 for outputting data on the current position of the elevating part 110 in the flow path.

In order to achieve the above objective, according to an embodiment of the present disclosure, there is provided a flow control system for controlling a flow rate supplied to a building using the flow control smart valve of the present disclosure, the system including: a flow control unit 10 in which the opening/closing unit 100 and the drive unit 200 are disposed to control a condition for a fluid in a flow path; and a measurement unit 20 disposed one at a front end and one at a rear end of the flow control unit 10 to measure the condition for the fluid in the flow path in real time.

As described above, the present disclosure makes it possible to automatically control the condition for the flow rate of a fluid passing through by measuring the fluid condition for the installed flow path in real time.

Furthermore, the present disclosure makes it possible to efficiently prevent water leakage between the opening/closing member and the housing flow path, and to prevent unintentional valve opening when power within the tolerance range is applied.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE DRAWINGS

Hereinafter, preferred embodiments of the present disclosure will be described in detail in order to describe in detail enough that a person of ordinary skill in the art to which the present disclosure pertains can easily practice the present disclosure.

The numbers cited in the embodiment below are not limited only to the objects of reference, and may be applied to all embodiments. Objects that exhibit the same purpose and effect as the configuration presented in the embodiments correspond to equivalent replacement objects. The higher-level concept presented in the embodiments includes sub-concept objects that are not described.

Embodiment 1-1

Figure 1:
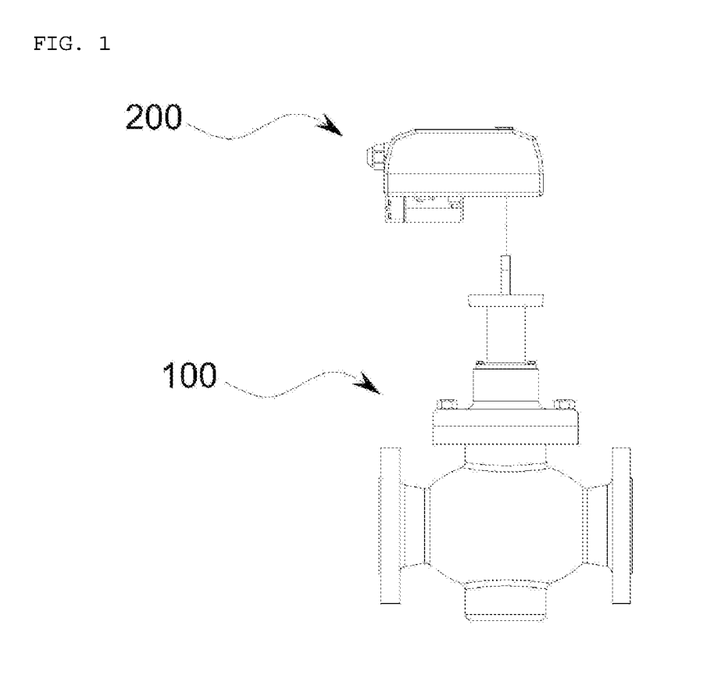
FIG. 1 is an exploded view showing a flow control smart valve of the present disclosure.

The present disclosure relates to a flow control valve, and includes: an opening/closing unit 100 disposed inside a flow path and selectively passing a fluid; and a drive unit 200 coupled with the opening/closing unit 100 to control the position of the opening/closing unit 100 on the flow path.

Embodiment 1-2

The present disclosure relates to a flow control valve, and in the embodiment 1-1, the drive unit 200 is formed in a structure selectively coupled to the upper end of the opening/closing unit 100.

In general, a valve refers to a device having a movable mechanism that allows a passage to be opened or closed to allow, shut off, or control a fluid. That is, the valve is installed in the middle of a pipe, which is a passage for fluids such as water, oil, and gas, to control the amount, flow direction, and pressure of the fluid.

Valves are classified into multiple categories according to their use and structural type, and include: a stop valve that is often used as a shutoff device for fluid, such as a faucet; a slew valve that controls the flow rate with a disk-shaped valve; a check valve that controls the flow of fluid in only one direction; a pressure reducing valve that can control and maintain the pressure of the fluid; and a cock valve that controls the shutoff and direction of gas like a gas cock.

The present disclosure also is a device formed in a structure installed on the flow path through which the fluid flows to control the flow rate and pressure of the fluid passing through the flow path. In order to implement the above function, the present disclosure is formed in a structure including the opening/closing unit 100 for selectively open and close the inside of the flow path and the drive unit 200 for controlling the position of the opening/closing unit 100 in the flow path.

The drive part 200 may be formed in a structure selectively coupled to the opening/closing unit 100 disposed in the flow path. That is, the drive unit 200 may be formed in a structure detachable from the opening/closing unit 100, ensuring easy maintenance when maintenance tasks are performed.

Embodiment 1-3

The present disclosure relates to a flow control valve, and in the embodiment 1-2, the drive unit 200 includes a coupling hole 201 communicating with the inside from the lower end.

Embodiment 1-4

The present disclosure relates to a flow control valve, and in the embodiment 1-3, the opening/closing unit 100 includes a coupling shaft selectively inserted into the inner periphery of the coupling hole 201.

The drive unit 200 may be formed in a structure selectively coupled from the opening/closing unit 100. Here, as the drive unit 200 is formed in a structure coupled to the upper end of the opening/closing unit 100, a configuration that substantially opens and closes the flow path can match the direction of blocking the flow path and the direction of gravity. The above structure may prevent in advance a safety accident that may occur due to the flow path being closed even in a state in which the opening/closing unit 100 is unintentionally released from the coupling structure from the drive unit 200.

In order to implement the above structure, the drive unit 200 may be formed in a structure including a coupling hole 201 that is formed at the lower end and communicates with the inside. That is, as the upper end of the configuration for selectively blocking the flow path in the opening/closing unit 100 is selectively inserted into the coupling hole 201, a coupling structure between the opening/closing unit 100 and the drive unit 200 is formed.

Embodiment 2-1

Figure 2:
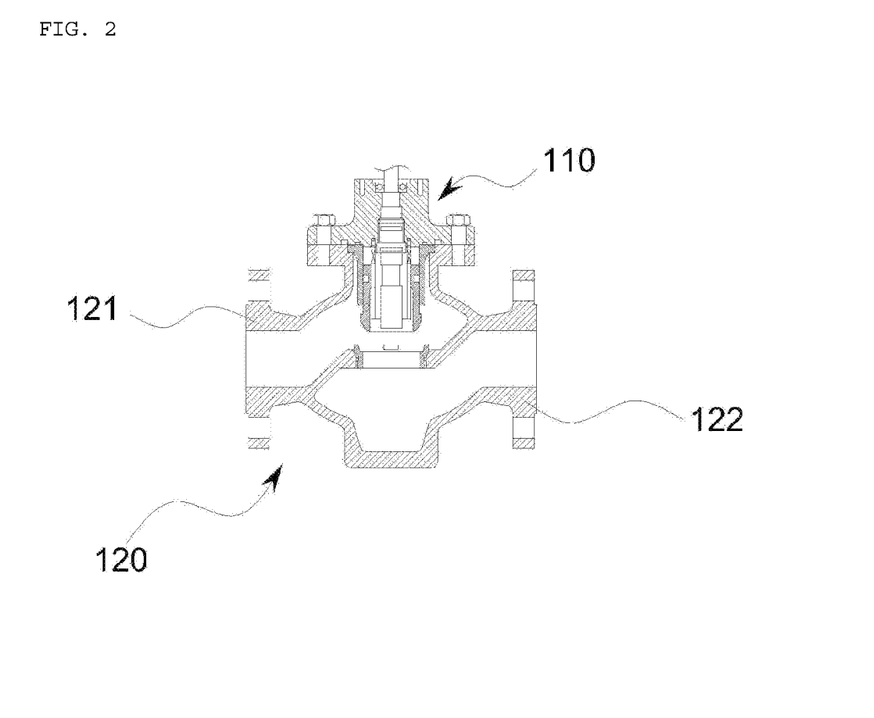
FIG. 2 is a projection view showing an opening/closing unit of the present disclosure.

The present disclosure relates to a flow control valve, and in the embodiment 1-1, the opening/closing unit 100 includes: an elevating part 110 disposed inside the flow path to selectively pass the fluid; and a housing 120 accommodating the elevating part 110 therein, and in which one side is coupled to an inlet pipe 1 and the other side is coupled to the outlet pipe 2.

The opening/closing unit 100 is disposed on the flow path through which the fluid flows, and is configured to selectively open and close the corresponding flow path. That is, the opening/closing unit 100 is formed in a structure including a configuration whose position disposed on the flow path is changed by the drive unit 200.

Accordingly, the opening/closing unit 100 includes the elevating part 110 disposed in the flow path and coupled to the drive unit 200 to rise or fall to a predetermined height, and the housing 120 to which the flow path having the inlet pipe 1 and the outlet pipe 2 at each end thereof in the longitudinal direction is coupled.

The elevating part 110 may be disposed inside the housing 120 to selectively open and close the flow path formed inside the housing 120.

Embodiment 2-2

The present disclosure relates to a flow control valve, and in the embodiment 2-1, the housing 120 includes a first housing 121 having a first inlet 121-1 formed at one end in the longitudinal direction of the housing 120 and coupled with the inlet pipe 1, and a first outlet 121-2 formed in the lower part.

Embodiment 2-3

The present disclosure relates to a flow control valve, and in the embodiment 2-2, the elevating part 110 is disposed on the inner upper end of the first housing 121 and is formed to be opposite to the first outlet 121-2.

Embodiment 2-4

The present disclosure relates to a flow control valve, and in the embodiment 2-3, the housing 120 includes: a second inlet 122-1 that is formed in the upper part and communicates with the first outlet 121-2; and a second outlet 122-2 formed at the other end in the longitudinal direction of the housing 120 and coupled to the outlet pipe 2.

The housing 120 accommodates the elevating part 110 therein, and may selectively open and close the flow path formed therein. The housing 120 may be formed in a structure including the first housing 121 receiving fluid from the inlet pipe 1 and a second housing 122 discharging the fluid to the outlet pipe 2.

The first housing 121 receiving the fluid from the inlet pipe 1 may include: the first inlet 121-1 coupled with the inlet pipe 1 at one end; and the first outlet 121-2 for discharging the fluid to the lower end. As the elevating part 110 is disposed at the upper end opposite to the first outlet 121-2, it is possible to selectively control the discharge of the fluid to the first outlet 121-2.

The second housing 122 for discharging the fluid to the outlet pipe 2 may include: the second inlet 122-1 receiving the fluid from the upper end; and the second outlet 122-2 that engages with the outlet pipe 2 at the other end.

In other words, when the elevating part 110 descends to a predetermined height to close the first outlet 121-2, the fluid does not flow into the second housing 122 through the second inlet 122-1. Accordingly, the fluid is not supplied to the outlet pipe 2, and the flow path may be closed.

Embodiment 2-5

Figure 3:
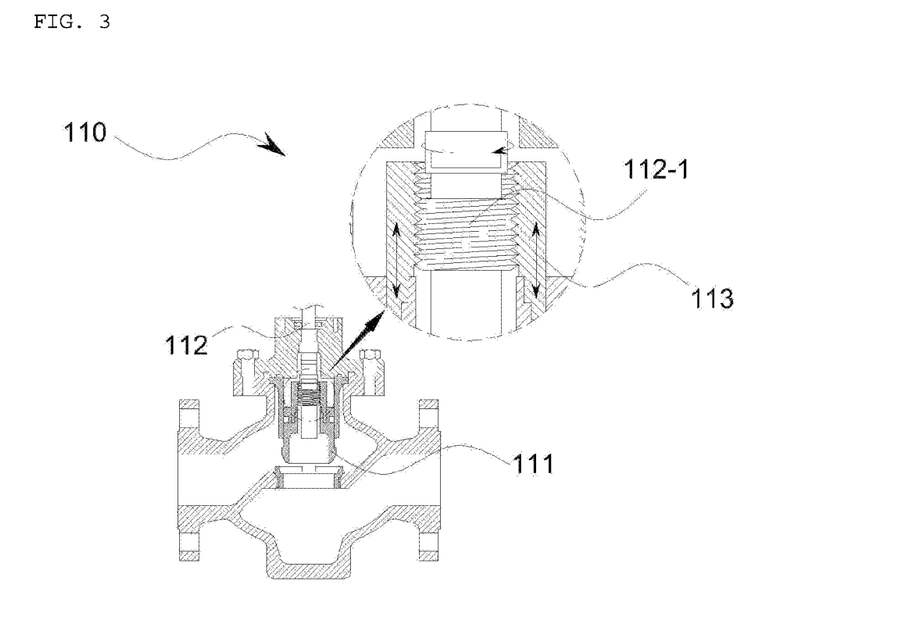
FIG. 3 is a projection view showing an embodiment of an elevating part of the present disclosure.

The present disclosure relates to a flow control valve, and in the embodiment 2-1, the elevating part 110 includes: an opening/closing member 111 that is selectively disposed in the path of the fluid to control the flow rate therethrough; a rotation shaft 112 receiving power from the drive unit 200 to determine a phase value of the opening/closing member 111; and a guide 113 in which the opening/closing member 111 is coupled to the lower end and the rotation shaft 112 is disposed on the inner periphery.

Embodiment 2-6

The present disclosure relates to a flow control valve, and in the embodiment 2-5, the rotation shaft 112 includes a rotational force transmitting means 112-1 extending from the outer periphery and in contact with the inner periphery of the guide 113.

The elevating part 110 is configured to selectively open and close the flow path formed between the inlet pipe 1 and the outlet pipe 2, and implements the above-described technology by the power provided by the drive unit 200.

The elevating part 110 may be formed to include: the opening/closing member 111 selectively blocks the flow path formed inside the housing 120; the rotation shaft 112 whose upper end is coupled to the drive unit 200 and rotates; and the guide for guiding the ascending and descending path of the opening/closing member 111. Here, the lower end of the rotation shaft 112 may include the rotational force transmitting means 112-1 that extends from the outer periphery and transmits the rotational force to the opening/closing member 111.

In other words, the rotational force transmitting means 112-1 transmits the rotational force supplied by the drive unit 200 to the opening/closing member 111 to determine the phase of the opening/closing member 111 on the corresponding flow path.

Embodiment 2-7

The present disclosure relates to a flow control valve, and in the embodiment 2-6, the outer periphery of the rotational force transmitting means 112-1 and the inner periphery of the opening/closing member 111 include a plurality of crests and roots having a predetermined pitch value.

Embodiment 2-8

Figure 4:
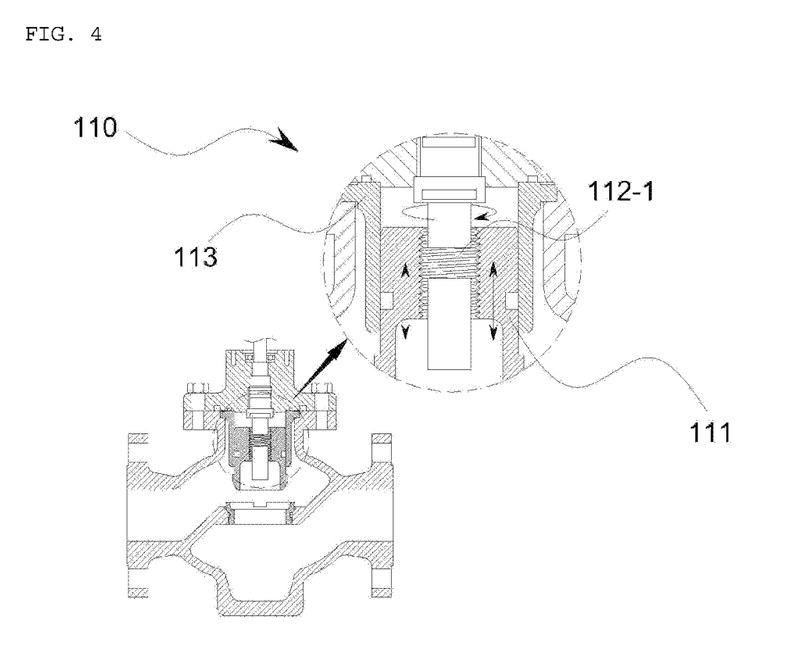
FIG. 4 is a projection view showing another embodiment of an elevating part of the present disclosure.

The present disclosure relates to a flow control valve, and in the embodiment 2-6, the outer periphery of the rotational force transmitting means 112-1 and the inner periphery of the guide 113 include a plurality of crests and roots having a predetermined pitch value.

The rotational force transmitting means 112-1 is configured to extend from the outer periphery of the lower end of the rotation shaft 122 that rotates in combination with the upper end of the drive unit 200. As the outer periphery is formed to be in contact with the inner periphery of the opening/closing member 111 or the guide 113, the phase value of the opening/closing member 111 on the corresponding flow path is determined.

Here, the outer periphery of the rotational force transmitting means 112-1 may be formed to include a plurality of crests and roots having a predetermined pitch value. As the inner periphery of the opening/closing member 111 or the guide 113 in contact with the outer periphery of the rotational force transmitting means 112-1 is also formed with a plurality of crests and roots having a corresponding shape, the rotational force of the rotation shaft 122 is converted into an ascending or descending force of the opening/closing member 111.

Embodiment 3-1

Figure 5:
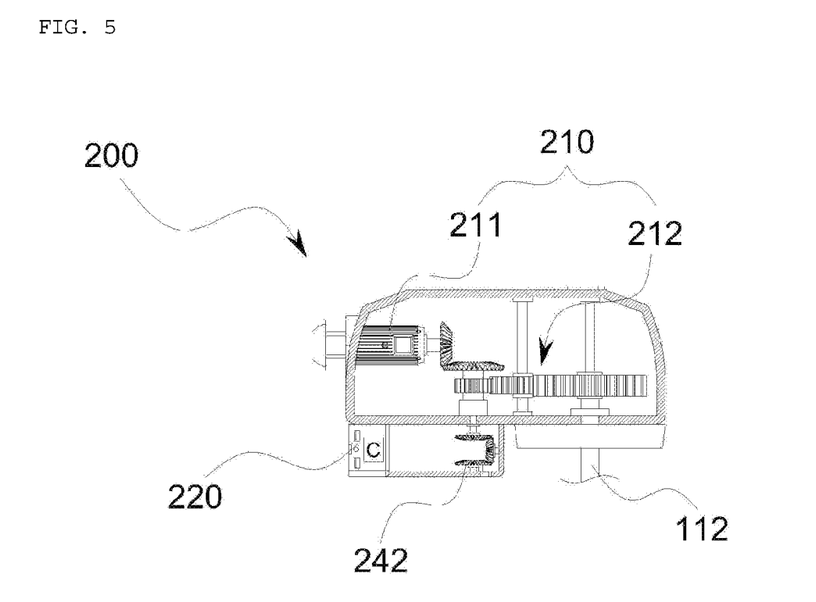
FIGS. 5 and 6 are exemplary views showing a drive unit of the present disclosure.
Figure 6:
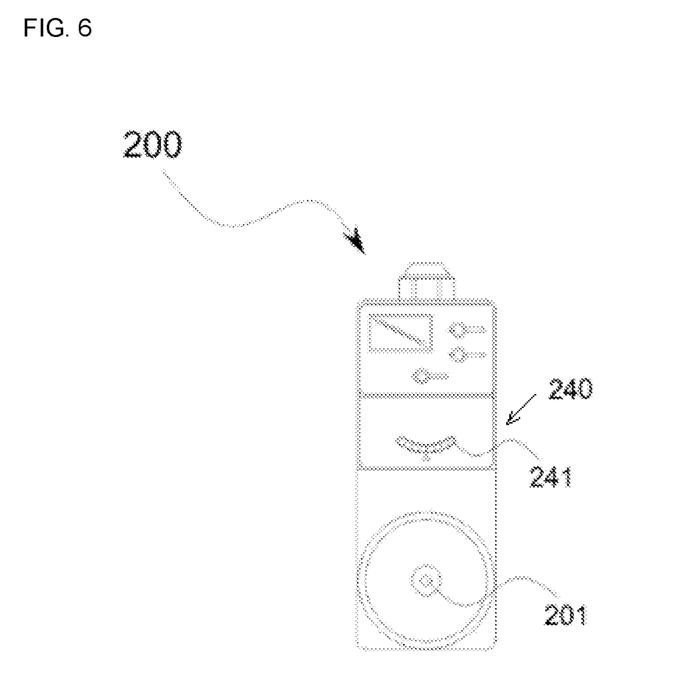

The present disclosure relates to a flow control valve, and in the embodiment 2-1, the drive unit 200 includes: a power part 210 that receives power and controls the position of the elevating part 110 in the flow path; a controller 220 for controlling the power applied to the power part 210; and a power supply part 230 interlocked with the power part 210 and the controller 220 to supply power required to control the position of the elevating part 110.

The drive unit 200 is configured to apply power to the opening/closing unit 100 and controls the phase value of the elevating part 110 disposed on the flow path. That is, the opening/closing member 111 for determining whether to open or close the flow path in the elevating part 110 determines whether to open or close the flow path as the phase value on the flow path is controlled by the rotation shaft 112 coupled to the drive unit 200. In other words, the drive unit 200 is preferably formed in a structure capable of imparting a rotational force to the rotation shaft 112.

In order to design as the above structure, the drive unit 200 may have a structure including the power part 210 that provides rotational force by combining with the elevating part 110, the controller 220 for controlling the power applied to the power part 210, and the power supply part 230 for selectively applying power to the power part 210.

Embodiment 3-2

The present disclosure relates to a flow control valve, and in the embodiment 3-1, the power part 210 includes a power means 211 for receiving power from the power supply part 230 and generating power required for position control of the elevating part 110.

Embodiment 3-3

The present disclosure relates to a flow control valve, and in the embodiment 3-2, the power means 211 includes a motor that rotates selectively by applied power.

The power part 210 is coupled with the upper end of the rotation shaft 112 that transmits power to the opening/closing member 111, and transmits a force for raising or lowering the opening/closing member 111 to the elevating part 110. Thus, the power part 210 may have a structure including the power means 211 for rotating the rotation shaft 112 by power applied from the power supply part 230.

At this time, the power means 211 is preferably formed of a motor that applies a rotational force to the upper end of the rotation shaft 112 due to the structural characteristics in which the rotation shaft 112 receiving power by the power means 211 should rotate.

Embodiment 3-4

The present disclosure relates to a flow control valve, and in the embodiment 3-2, the power part 210 includes a power transmitting part 212 in which one side is coupled to the power means 211 and the other side is coupled to the elevating part 110.

Embodiment 3-5

The present disclosure relates to a flow control valve, and in the embodiment 3-4, the power transmitting part 212 includes a plurality of power transmitting gears interposed between the power means 211 and the elevating part 110.

The power means 211 should be formed in a structure that can impart a rotational force to the upper end of the rotation shaft 122 in accordance with the power supply part 230 applying power to the power means 211.

In order to design as the above structure, the power part 210 may include the power transmitting part 212 whose one side is coupled to the power means 211 and the other side is coupled to the upper end of the rotation shaft 122. Here, the power transmitting part 212 is preferably formed of a structure having the plurality of power transmitting gears coupled with a driven shaft finally rotated by the applied power and at the same time coupled with the upper outer periphery of the rotation shaft 122.

Embodiment 3-6

The present disclosure relates to a flow control valve, and in the embodiment 3-1, the power supply part 230 includes: a power supply means continuously supplied with external power; and a storage battery for temporarily storing the power supplied from the power supply means.

The power supply part 230 is configured to selectively apply power to the power part 210 by the controller 220. Accordingly, the power supply part 230 may be formed in a structure including the power supply means receiving power from the outside.

When power is not smoothly supplied through the power supply means, there may be a problem in that opening and closing of the corresponding flow path is not performed. In order to solve such problem, the power supply part 230 may include the storage battery for temporarily accommodating the power supplied through the power supply means. That is, in an emergency when power is not supplied from the power supply means, power may be applied to the power part 210 by utilizing the power stored in the storage battery.

Embodiment 4-1

The present disclosure relates to a flow control valve, and in the embodiment 3-1, the controller 220 includes: a reception part 221 receiving a measurement value for controlling the position of the elevating part 110; a calculation part 222 that determines whether the flow path of the elevating part 110 is opened or closed on the basis of the measurement value transmitted from the reception part 221; and a transmission part 223 for transmitting the value calculated by the calculation part 222 to the outside.

The controller 220 is configured to control the power supplied to the power part 210. That is, the controller 220 is formed in a structure interlocking with the power part 210 and the power supply part 230 to dependently control the phase of the elevating part 110 disposed on the flow path.

Here, the controller 220 may be formed in a structure including: the reception part 221 receiving calculation-based measurement value from other components; the calculation part 222 for calculating an elevation height value of the elevation part 110 on the basis of the measurement value transmitted through the reception part 221; and the transmission part 223 for transferring data that has been calculated in the calculation part 222 to another configuration.

Embodiment 4-2

The present disclosure relates to a flow control valve, and in the embodiment 4-1, the reception part 221 includes a drive reception part 221-1 that receives the measurement value of the power supplied from the power supply part 230.

Embodiment 4-3

The present disclosure relates to a flow control valve, and in the embodiment 4-1, the transmission part 223 includes a drive transmission part 223-1 that transmits the value calculated by the calculation part 222 to the power part 210.

The reception part 221 is configured to receive the measurement value required by the calculation part 222 from other components. The reception part 221 may be formed to receive voltage and current values from the power supply part 230. That is, the reception part 221 may include the drive reception part 221-1 that interworks with the power supply part 230 to receive the measurement value.

On the basis of the measurement value received from the drive reception part 221-1, the calculation part 222 calculates a phase value in which the opening/closing member 111 is disposed on the flow path. The transmission part 223 may be configured to transmit a calculated value to the power part 210. That is, the transmission part 223 may include the drive transmission part 223-1 interlocked with the power part 210 to transmit the amount of power applied to the power means 211.

Embodiment 4-4

The present disclosure relates to a flow control valve, and in the embodiment 4-1, the reception part 221 includes a remote reception part 221-2 that receives a flow path opening/closing signal from the outside.

Embodiment 4-5

The present disclosure relates to a flow control valve, and in the embodiment 4-1, the transmission part 223 includes a remote transmission part 223-2 that transmits the value calculated by the calculation part 222 to an external server.

The reception part 221 that receives the measurement value required by the calculation part 222 from other components is formed in a structure that receives the flow path opening/closing signal from the outside. Thus, a manager may control the phase value of the opening/closing member 111 on the flow path even in a state where no physical manipulation is applied to the opening/closing unit 100.

In order to realize the above structure, the reception part 221 may include the remote reception part 221-2 that receives the flow path opening/closing signal from the outside. That is, the calculation part 222 calculates a value for whether the flow path is opened or closed on the basis of the value received from the remote reception part 221-2.

As the transmission part 223 that transmits the value calculated by the calculation part 222 to another configuration is configured to transmit the value on whether the flow path is opened or closed to the outside, the manager may recognize whether the flow path of the opening/closing unit 100 is opened or closed from a distance. In order to realize the above structure, the transmission part 223 may include the remote transmission part 223-2 that transmits the flow path open/close state to the outside.

Embodiment 5-1

The present disclosure relates to a flow control valve, and in the embodiment 4-1, the calculation part 222 includes: an opening/closing calculation part 222-1 that determines whether the flow path is opened or closed; and an offset calculation part 222-2 that corrects an error with respect to the measurement value transmitted from the reception part 221.

Embodiment 5-2

The present disclosure relates to a flow control valve, and in the embodiment 5-1, the reception part 221 is formed to preferentially transfer the measurement value received from the power supply part 230 to the offset calculation part 222-2.

The calculation part 222 calculates the phase value of the elevating part 110 with respect to the flow rate value of the fluid passing through the flow path on the basis of the measured value transmitted from the reception part 221. To this end, the calculation part 222 may be formed in a structure including an opening/closing calculation part 222-1 that calculates a value of the ascending or descending height of the elevating part 110.

At this time, as the minimum power for maintaining the electrical circuit is applied to the power supply part 230, an error may be included in the power data transmitted from the reception part 221 to the calculation part 222. Accordingly, the calculation part 222 may be configured to include the offset calculation part 222-2 for correcting the error in the measurement value transmitted by the reception part 221.

Embodiment 5-3

The present disclosure relates to a flow control valve, and in the embodiment 5-1, the offset calculation part 222-2 includes: a reference value setting part 222-2A to store the set error range; and a comparative judgment part 222-2B comparing the measurement value transmitted from the receiving unit 221 with an error value stored in the reference value setting part 222-2A.

Embodiment 5-4

The present disclosure relates to a flow control valve, and in the embodiment 5-3, the comparative judgment part 222-2B is formed in a structure that transmits the measurement value to the opening/closing calculation part 222-1 only for the measurement value outside the error range stored in the reference value setting part 222-2A.

Embodiment 5-5

The present disclosure relates to a flow control valve, and in the embodiment 5-1, the opening/closing calculation part 222-1 is formed in a structure that calculates the amount of power supplied from the power part 210 to the elevating part 110.

The offset calculation part 222-2 is configured to correct the error with respect to the measurement value transmitted from the reception part 221. Thus, it is preferable that the offset calculation part 222-2 performs a function of substantially correcting the error value and setting a reference error range at the same time.

In order to implement the above technique, the offset calculation part 222-2 may have a structure including the reference value setting part 222-2A to store the error range set by the manager and the comparative judgment part 222-2B to compare the stored error range with the measurement value transmitted from the reception part 221.

When it is determined that the result calculated by the comparative judgment part 222-2B is out of the error range, the measured value received by the reception part 221 is transmitted to the opening/closing calculation part 222-1 to calculate an ascending or descending height value of the elevating part 110. That is, the opening/closing calculation part 222-1 may be formed to have a structure that selectively calculates only the measured values out of the error range.

Embodiment 6-1

Figure 7:
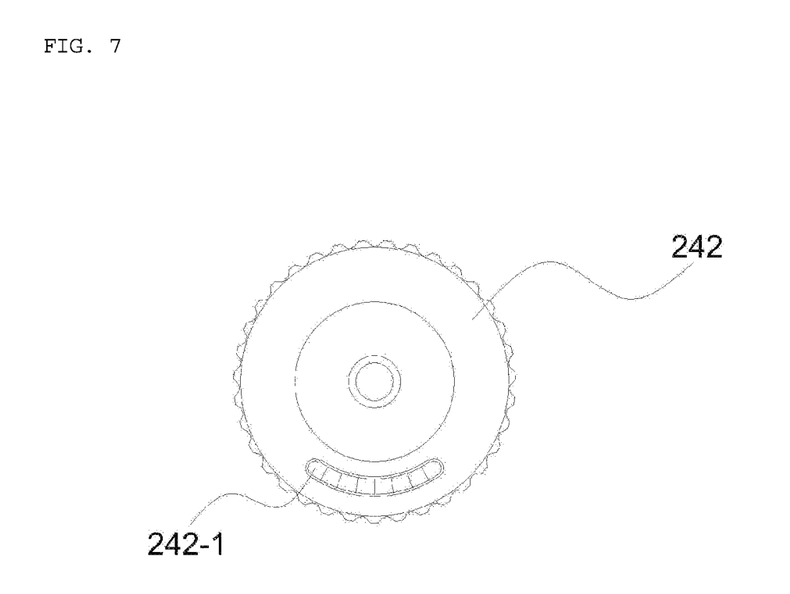
FIG. 7 is an exemplary view showing a status indicating gear of the present disclosure.

The present disclosure relates to a flow control valve, and in the embodiment 3-1, the drive unit 200 includes a display part 240 for outputting data on the current position of the elevating part 110 in the flow path.

Embodiment 6-2

The present disclosure relates to a flow control valve, and in the embodiment 6-1, the display part 240 includes a display window 241 for outputting the amount of power supplied by the power part 210 to the elevating part 110 to the outside.

Embodiment 6-3

The present disclosure relates to a flow control valve, and in the embodiment 6-2, the display window 241 is formed of a transparent material.

The elevating part 110 selectively opens and closes the corresponding flow path by the power part 210. Here, due to the structural characteristics of the elevating part 110 being accommodated inside the housing 120, there is a problem that the manager may not intuitively recognize whether the flow path is opened or closed and the flow rate of the fluid passing therethrough.

In order to solve the above problem, the drive unit 200 may be formed in a structure including the display part 240 displaying data on the phase in which the elevating part 110 is disposed and the flow rate of the fluid passing through on the corresponding flow path in which the opening/closing unit 100 is disposed.

At this time, the display part 240 may be formed at the lower end of the drive unit 200 to have a structure including the display window 241 for projecting an internal state. That is, through the display window 241 formed of a transparent material, the manager may easily recognize the state of the drive unit 200.

Embodiment 6-4

The present disclosure relates to a flow control valve, and in the embodiment 6-3, the display part 240 includes a status indicating gear 242 coupled to the rotation shaft of the power part 210 and disposed opposite to the display window 241 on one surface in the thickness direction.

Embodiment 6-5

The present disclosure relates to a flow control valve, and in the embodiment 6-4, included is a spectrum 242-1 having a curvature value corresponding to the outer diameter of the status indicating gear 242 and including a plurality of colors along the longitudinal direction on one surface in the thickness direction of the status indicating gear 242 disposed opposite to the display window 241.

The display part 240 is disposed at the lower end of the drive unit 200 to which the opening/closing unit 100 is selectively coupled, and is configured to transmit the internal state of the drive unit 200 to the manager.

The display part 240 includes the status indicating gear 242 projecting the current state of the power part 210 that transmits the force to ascend or descend to the elevating part 110 on the display window 241, and the status indicating gear 242 may be formed in a structure coupled to the power part 210.

In the status indicating gear 242, the spectrum 242-1 including the plurality of colors may be disposed at a position opposite to the display window 241. As the spectrum 242-1 is formed in a shape having the same curvature value as the outer diameter of the status indicating gear 242, the display window 241 is formed in a structure that is displayed in different colors according to the rotation amount of the status indicating gear 242 rotated by the power part 210.

Embodiment 7-1

Figure 8:
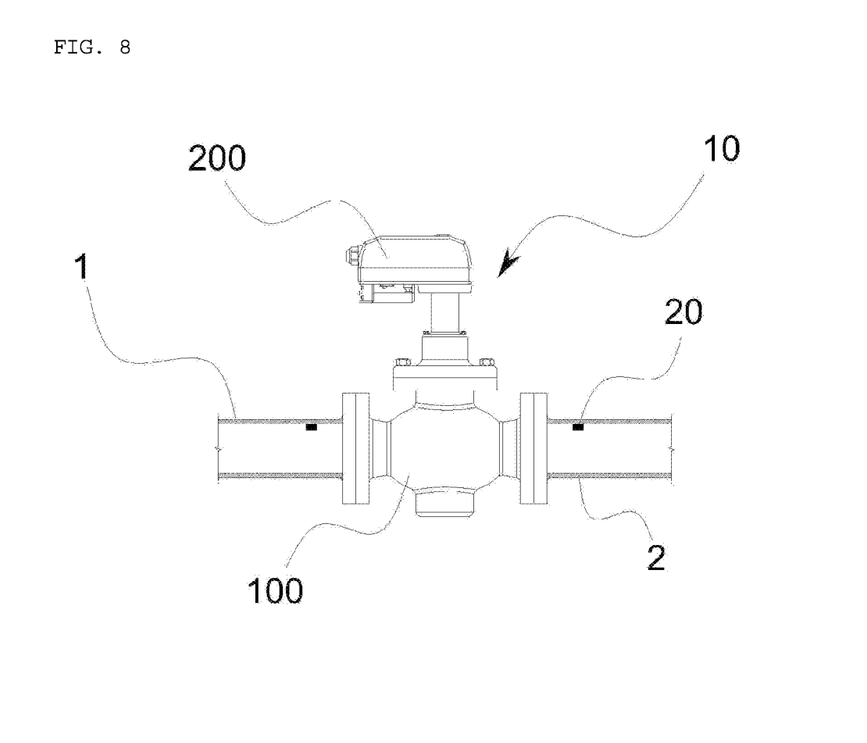
FIGS. 8 and 9 are exemplary views showing a flow control system of the present disclosure.
Figure 9:
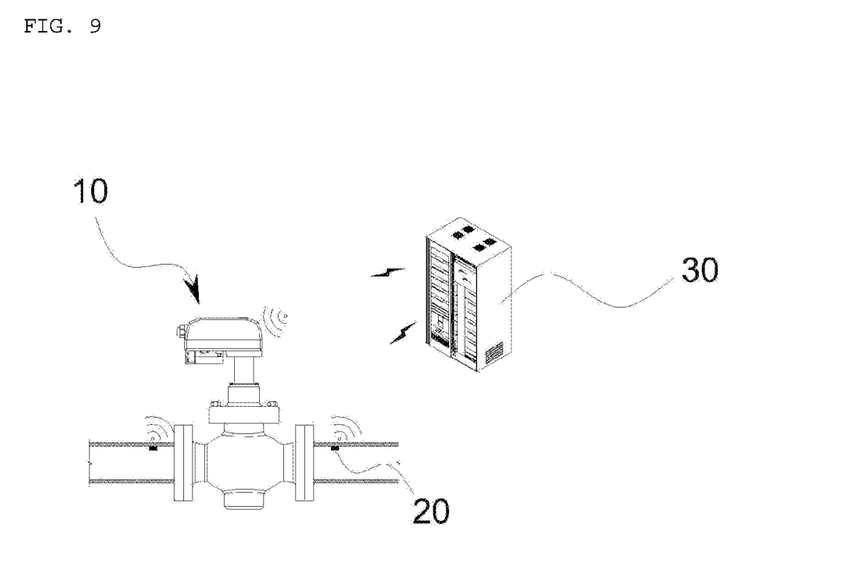

The present disclosure relates to a flow control system using the valve in one of the embodiments 1-1 to 6-1. The system includes: a flow control unit 10 in which the opening/closing unit 100 and the drive unit 200 are disposed to control the condition for the fluid in the flow path; and a measurement unit 20 disposed one at the front end and one at the rear end of the flow control unit 10 to measure the condition for the fluid in the flow path in real time.

Embodiment 7-2

The present disclosure relates to a flow control system, and in the embodiment 7-1, the measurement unit 20 is configured to transmit the measured value to the drive unit 200.

The smart valve of the present disclosure including the opening/closing unit 100 and the drive unit 200 is disposed between the inlet pipe 1 and the outlet pipe 2 to selectively open and close the corresponding flow path. That is, in the flow path through which the fluid selectively passes, the flow control unit 10 in which the opening/closing unit 100 controls the flow rate by the drive unit 200, and the measurement unit 20 that measures the specifications of the fluid in the flow path in real time may be included.

Figure 10:
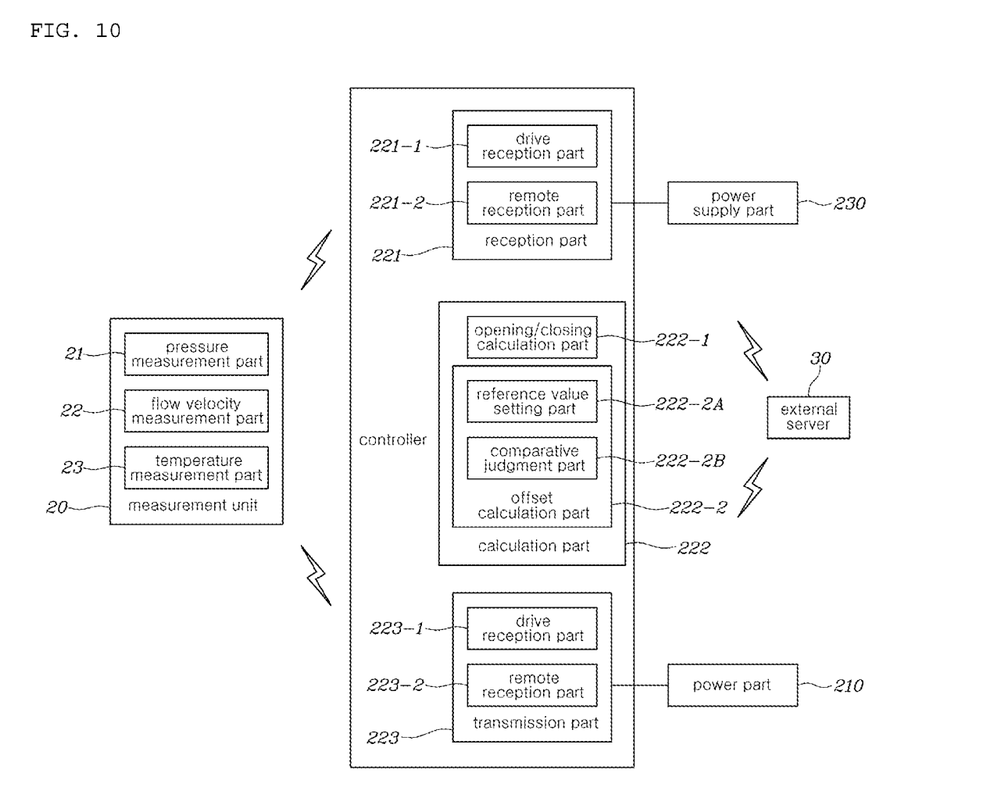
FIG. 10 is an exemplary view showing an interlocking structure of the present disclosure.

The value measured in real time by the measurement unit 20 is transmitted to the flow control unit 10, so that the passing flow may be varied according to conditions inside the flow path. On the basis of the value measured by the measurement unit 20, the calculation part 222 calculates an optimal value for the flow passing through the corresponding flow path. That is, the calculation part 222 calculates the optimal value of the ascending or descending height of the elevating part 110. Accordingly, a specification value of the fluid measured by the measurement unit 20 is supplied to the reception part 221 to prepare the calculation-based data of the calculation part 222.

Embodiment 7-3

The present disclosure relates to a flow control system, and in the embodiment 7-2, the measurement unit 20 includes a pressure measurement part 21 that measures the pressure values of the front end and the rear end of the flow control unit 10 in real time.

Embodiment 7-4

The present disclosure relates to a flow control system, and in the embodiment 7-2, the measurement unit 20 includes a flow velocity measurement part 22 that measures the flow velocity values of the front end and the rear end of the flow control unit 10 in real time.

Embodiment 7-5

The present disclosure relates to a flow control system, and in the embodiment 7-2, the measurement unit 20 includes a temperature measurement part 23 that measures the temperature values of the front end and the rear end of the flow control unit 10 in real time.

The measurement unit 20 is disposed one at the front end and one at the rear end of the flow control unit 10 composed of the opening/closing unit 100 and the drive unit 20, and configured to measure the conditions for the inlet pipe 1 and the outlet pipe 2 of the flow path in real time. The measurement unit 20 may be formed in a structure including: the pressure measurement part 21 that measures the pressure value of the flow path in real time; the flow velocity measurement part 22 that measures the velocity value of the fluid passing through the flow path; and the temperature measurement part 23 that measures the temperature value of the fluid.

According to the values measured by the plurality of measurement parts, the flow control unit 10 may determine an ascending or descending height with respect to the elevating part 110. That is, as the flow control process for meeting the condition for the outlet pipe 2 set by the manager is automated, it is possible to reduce the fatigue of the manager.

The invention claimed is:

1. A flow control smart valve installed in a flow path through which a fluid flows, the valve comprising:
    an opening/closing unit disposed inside the flow path and selectively passing the fluid; and
    a drive unit coupled with the opening/closing unit to control a position of the opening/closing unit in the flow path;
    wherein the opening/closing unit includes,
        an elevating part disposed inside the flow path and selectively passing the fluid, and
        a housing that accommodates the elevating part therein, and in which a first side is coupled to an inlet pipe and a second side is coupled to an outlet pipe;
    wherein the elevating part includes,
        an opening/closing member selectively blocks the flow path formed inside the housing,
        a rotation shaft whose upper end is coupled to the drive unit and rotates, and
        a guide for guiding ascending and descending paths of the opening/closing member;
    wherein a lower end of the rotation shaft includes a rotational force transmitting means that extends from the outer periphery and transmits the rotational force to the opening/closing member;
    wherein an outer periphery of the rotational force transmitting means includes a plurality of crests and roots having a predetermined pitch value; and
    wherein an inner periphery of the opening/closing member in contact with the outer periphery of the rotational force transmitting means includes a plurality of crests and roots having a shape corresponding to the plurality of crests and roots of the outer periphery of the rotational force transmitting means,
    wherein the drive unit includes:
    a power part that receives power and controls the position of the elevating part in the flow path;
    a controller that controls the power applied to the power part;
    a power supply part that interworks with the power part and the controller to supply power required to control the position of the elevating part; and
    a display part for outputting data on the current position of the elevating part in the flow path,
    wherein the display part includes:
    a display window for outputting the amount of power supplied by the power part to the elevating part to the outside; and
    a status indicating gear coupled to a rotation shaft of the power part and disposed opposite to the display window on one surface in the thickness direction,
    wherein the display window is formed of a transparent material, and
    wherein the status indicating gear includes a spectrum having a curvature value corresponding to the outer diameter of the status indicating gear and including a plurality of colors along the longitudinal direction on one surface in the thickness direction of the status indicating gear disposed opposite to the display window.

2. The flow control smart valve of claim 1, wherein the controller includes:
    a reception part for receiving a measurement value for controlling the position of the elevating part;
    a calculation part for determining whether to open or close the flow path by the elevating part on the basis of the measurement value transmitted from the reception part; and
    a transmission part for transmitting the value calculated by the calculation part to the outside.

3. The flow control smart valve of claim 2, wherein the calculation part includes:
   an opening/closing calculation part for determining whether to open or close the flow path; and
   an offset calculation part for correcting an error with respect to the measurement value transmitted from the reception part.

4. A flow control system for controlling a flow rate supplied to a building using the flow control smart valve of claim 1, the system comprising:
   a flow control unit in which the opening/closing unit and the drive unit are disposed to control a condition for a fluid in a flow path; and
   a measurement unit disposed one at a front end and one at a rear end of the flow control unit to measure the condition for the fluid in the flow path in real time.

5. A flow control smart valve installed in a flow path through which a fluid flows, the valve comprising:
   an opening/closing unit disposed inside the flow path and selectively passing the fluid; and
   a drive unit coupled with the opening/closing unit to control a position of the opening/closing unit in the flow path;
   wherein the opening/closing unit includes,
      an elevating part disposed inside the flow path and selectively passing the fluid, and
      a housing that accommodates the elevating part therein, and in which a first side is coupled to an inlet pipe and a second side is coupled to an outlet pipe;
   wherein the elevating part includes,
      an opening/closing member selectively blocks the flow path formed inside the housing,
      a rotation shaft whose upper end is coupled to the drive unit and rotates, and
      a guide for ascending and descending the opening/closing member;
   wherein a lower end of the rotation shaft includes a rotational force transmitting means that extends from the outer periphery and transmits the rotational force to the opening/closing member;
   wherein an outer periphery of the rotational force transmitting means includes a plurality of crests and roots having a predetermined pith value; and
   wherein an inner periphery of the guide in contact with the outer periphery of the rotational force transmitting means includes a plurality of crests and roots having a shape corresponding to the plurality of crests and roots of the outer periphery of the rotational force transmitting means,
   wherein the drive unit includes:
   a power part that receives power and controls the position of the elevating part in the flow path;
   a controller that controls the power applied to the power part;
   a power supply part that interworks with the power part and the controller to supply power required to control the position of the elevating part; and
   a display part for outputting data on the current position of the elevating part in the flow path,
   wherein the display part includes:
   a display window for outputting the amount of power supplied by the power part to the elevating part to the outside; and
   a status indicating gear coupled to a rotation shaft of the power part and disposed opposite to the display window on one surface in the thickness direction,
   wherein the display window is formed of a transparent material, and
   wherein the status indicating gear includes a spectrum having a curvature value corresponding to the outer diameter of the status indicating gear and including a plurality of colors along the longitudinal direction on one surface in the thickness direction of the status indicating gear disposed opposite to the display window.

* * * * *